United States Patent
Da Silva Medeiros et al.

(10) Patent No.: US 12,404,376 B2
(45) Date of Patent: Sep. 2, 2025

(54) METHOD FOR INCORPORATING CARBON NANOMATERIALS INTO AN FBE POLYMER MATRIX IN SOLID PHASE, PRODUCT AND USE

(71) Applicants: UNIVERSIDADE FEDERAL DE MINAS GERAIS, Belo Horizonte (BR); VALLOUREC TUBOS DO BRASIL LTDA., Brumadinho (BR)

(72) Inventors: Felipe Da Silva Medeiros, Belo Horizonte (BR); Vinícius Gomide De Castro, Belo Horizonte (BR); Glaura Goulart Silva, Belo Horizonte (BR); Camila Salomão Ribeiro Cury, Brumadinho (BR)

(73) Assignees: UNIVERSIDADE FEDERAL DE MINAS GERAIS, Belo Horizonte (BR); VALLOUREC TUBOS DO BRASIL LTDA., Brumadinho (BR)

( * ) Notice: Subject to any disclaimer, the term of this patent is extended or adjusted under 35 U.S.C. 154(b) by 471 days.

(21) Appl. No.: 18/006,661

(22) PCT Filed: Jul. 26, 2021

(86) PCT No.: PCT/IB2021/056771
§ 371 (c)(1),
(2) Date: Jan. 24, 2023

(87) PCT Pub. No.: WO2022/023954
PCT Pub. Date: Feb. 3, 2022

(65) Prior Publication Data
US 2023/0279187 A1    Sep. 7, 2023

(30) Foreign Application Priority Data
Jul. 28, 2020    (BR) .................. 10 2020 015342 0

(51) Int. Cl.
*C08J 3/20* (2006.01)
*B01F 33/83* (2022.01)
*C08K 3/04* (2006.01)

(52) U.S. Cl.
CPC .............. *C08J 3/203* (2013.01); *B01F 33/83* (2022.01); *B01F 2215/0431* (2013.01);
(Continued)

(58) Field of Classification Search
None
See application file for complete search history.

(56) References Cited

U.S. PATENT DOCUMENTS 4,157,273 A    6/1979  Brady
2013/0244175 A1    9/2013  Matzner et al.
(Continued)

FOREIGN PATENT DOCUMENTS

CN    107377340 A    11/2017
CN    107686635 A  *  2/2018    .............. C08K 3/04
(Continued)

OTHER PUBLICATIONS

Shivan Ismael Abdullah, et al., "Mechanical properties of graphene oxide (GO)/epoxy composites." HBRC Journal (2015), 11:2, 151-156, DOI: 10.1016/j.hbrcj.2014.06.001.
(Continued)

*Primary Examiner* — Eli D. Strah
(74) *Attorney, Agent, or Firm* — LUCAS & MERCANTI, LLP

(57) ABSTRACT

The present technology relates to an efficient process of mixing, dispersing and integrating reduced graphene oxide (RGO) or carbon nanomaterials or nanostructured materials to the epoxy matrix of the "fusion-bonded epoxy" (FBE) type. The polymeric material consists of a mixture of the solid epoxy particulate with a curing agent, catalyst, pig-
(Continued)

Images obtained with a stereoscopic microscope or microscopic magnifying glass of the surface of the composite coatings prepared from the dispersion of RGO in FBE, in two rotations (230 rpm and 2000 rpm), with the addition of A) 0.1% m/m; B) 0.3% m/m; C) 0.5% m/m and D) 1.0% m/m of RGO-RT.

ments and inorganic additives. It allows to integrate nanometric particulate additives in FBE, using FBE in solid state. Powder FBE+RGO system mixes are produced by means of a planetary ball mill or high energy planetary ball mill with internal addition of balls, with time and rotation control. The mixtures show little or no sign of RGO aggregation after application of the composite as a coating on metals. The mixture of FBE+RGO can be applied to metallic surfaces to protect against abrasive processes and corrosion without compromising the properties presented by FBE applied without nanomaterials. There were increases of up to 11% in abrasion resistance, improvement in the material's resistance to accelerated tests, such as immersion in a hot water bath, and a significant increase in adherence, of approximately 100% after the hot bath immersion test.

13 Claims, 2 Drawing Sheets

(52) U.S. Cl.
CPC ... *B01F 2215/0481* (2013.01); *C08J 2363/00* (2013.01); *C08K 3/042* (2017.05); *C08K 2201/011* (2013.01)

(56) References Cited

U.S. PATENT DOCUMENTS

| | | | |
|---|---|---|---|
| 2017/0166722 A1* | 6/2017 | Zhamu | C08K 3/04 |
| 2021/0047187 A1* | 2/2021 | Paris Escribano | B82Y 30/00 |

FOREIGN PATENT DOCUMENTS

| | | |
|---|---|---|
| KR | 102039519 B1 | 11/2019 |
| RU | 2654959 C2 | 5/2018 |
| WO | 2009073716 A1 | 6/2009 |
| WO | 2009112824 A1 | 9/2009 |
| WO | 2010096345 A1 | 8/2010 |
| WO | 2011163100 A2 | 12/2011 |
| WO | 2013187962 A1 | 12/2013 |

OTHER PUBLICATIONS

Heechan Cho, et al., "Optimum choice of the make-up ball sizes for maximum throughput in tumbling ball mills." Powder Technology, vol. 246, 2013, pp. 625-634, ISSN 0032-5910.
HaeRi Jeon, et al., "Corrosion protection by epoxy coating containing multi-walled carbon nanotubes." Journal of Industrial and Engineering Chemistry, vol. 19, Issue 3, 2013, pp. 849-853, ISSN 1226-086X.
Garima Mittal, et al., "A review on carbon nanotubes and graphene as fillers in reinforced polymer nanocomposites," Journal of Industrial and Engineering Chemistry, vol. 21, 2015, pp. 11-25, ISSN 1226-086X.
Alexander B. Morgan, "Polymer-Clay Nanocomposites: Design andApplication of Multi-Functional Materials," Material Matters, vol. 2, Issue 1. 2023.
Patricia A. Saliba, et al., "Advanced Nanocomposite Coatings of Fusion Bonded Epoxy Reinforced with Amino-Functionalized Nanoparticles for Applications in Underwater Oil Pipelines", Journal of Nanomaterials, vol. 2016, Article ID 7281726, 16 pages, 2016. https://doi.org/10.1155/2016/7281726.
Weiwei Xiao, et al., "Composites of graphene oxide and epoxy resin assuming a uniform 3D graphene oxide network structure," RSC Adv., 2016, 6, 86904, DOI: 10.1039/c6ra16335a.
Shravan Kumar Yadav, et al., "Synthesis and Characterization of Copper Nanoparticles, Using Combination of Two Different Sizes of Balls in Wet Ball Milling," International Journal of Emerging Trends in Science and Technology, vol. 3, Issue 4, pp. 3795-3799, 2016. ISSN 2348-9480.
Thiara Francis Mateus Rodrigues (2016), Formação De Depósitos De CACO3 Sobre Superfícies Revestidas Com Nanocompósitos De Matriz Epóxi Com Adição De Nanopartículas De SIO2 [Master's Dissertation, COPPE, Federal University of Rio de Janeiro].
International Search Report and Written Opinion for corresponding International Application No. PCT/IB2021/056771, dated Dec. 8, 2021 (11 pages).

* cited by examiner

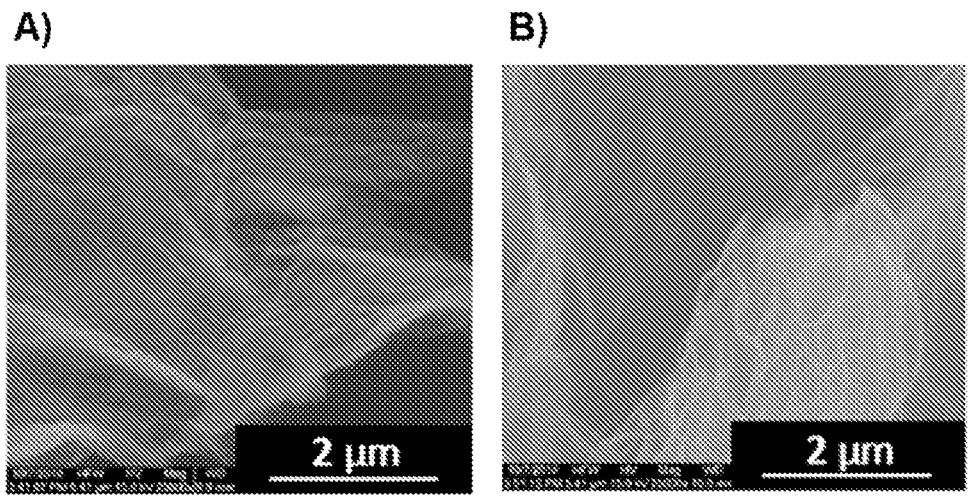

Figure 1 - Scanning electron microscopy images of A) reduced graphene oxide via thermal reduction and expansion in a microwave oven (RGO-ET) and B) reduced graphene oxide via thermal reduction in an oven (RGO-RT).

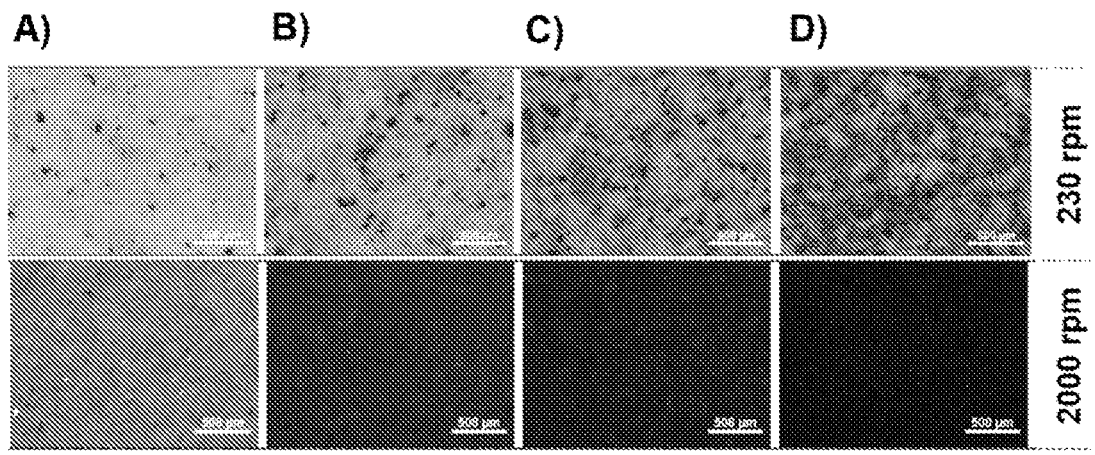

Figure 2 – Images obtained with a stereoscopic microscope or microscopic magnifying glass of the surface of the composite coatings prepared from the dispersion of RGO in FBE, in two rotations (230 rpm and 2000 rpm), with the addition of A) 0.1% m/m; B) 0.3% m/m; C) 0.5% m/m and D) 1.0% m/m of RGO-RT.

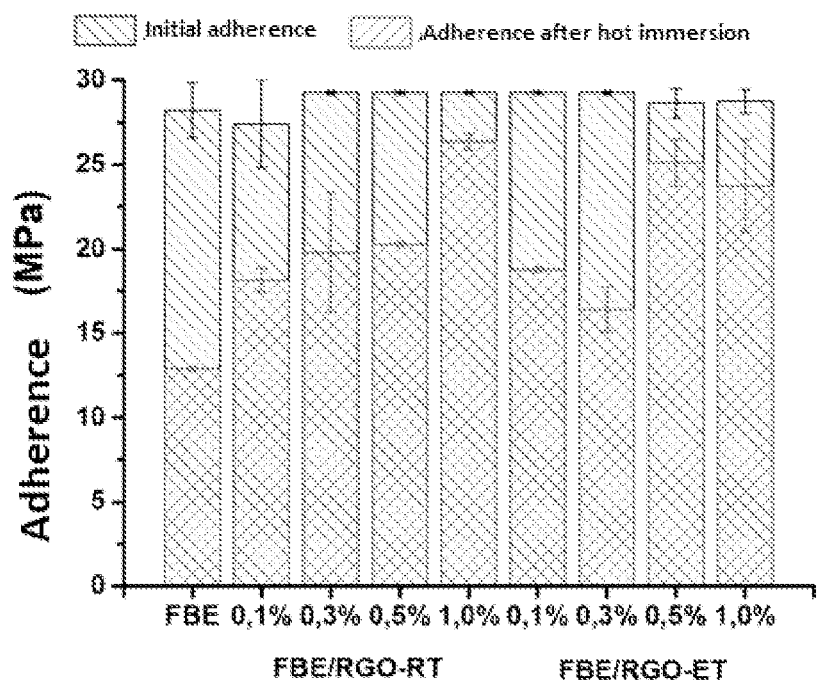
Figure 3 – Bar graph of pull-off adhesion before and after immersion in a hot bath.

METHOD FOR INCORPORATING CARBON NANOMATERIALS INTO AN FBE POLYMER MATRIX IN SOLID PHASE, PRODUCT AND USE

CROSS REFERENCE TO RELATED APPLICATION

This Application is a 371 of PCT/IB2021/056771 filed on Jul. 26, 2021 which, in turn, claimed the priority of Brazilian Patent Application No. 10 2020 015342 0 filed on Jul. 28, 2020, both applications are incorporated herein by reference.

The present technology refers to an efficient process of mixing, dispersing and integrating reduced graphene oxide (RGO) or carbon nanomaterials or nanostructured materials to the epoxy matrix of the "fusion-bonded epoxy" (FBE) type. The polymeric material consists of a mixture of the solid epoxy particulate with a curing agent, catalyst, pigments and inorganic additives. It allows to integrate nanometric particulate additives in FBE, using FBE in solid state. Powder FBE+RGO system mixes are produced by means of a planetary ball mill or high energy planetary ball mill with internal addition of balls, with time and rotation control. The mixtures show little or no sign of RGO aggregation after application of the composite as a coating on metals. The mixture of FBE+RGO can be applied to metallic surfaces to protect against abrasive processes and corrosion without compromising the properties presented by FBE applied without nanomaterials. There were increases of up to 11% in abrasion resistance, improvement in the material's resistance to accelerated tests, such as immersion in a hot water bath, and an expressive increase in adherence, of approximately 100%, after the immersion test in a hot bath.

Polymeric coatings have been used to protect metal parts and were initially used to mitigate corrosion on metals. Technological advances in formulations and processes have improved the performance of these materials, increasing the useful life of pipes, valves, metallic structures in the sugar-alcohol, sanitation, mining, oil, civil construction and industry in general.

Epoxy resins have been widely used as matrices for polymer-based composites due to their unique stiffness, dimensional stability, chemical resistance and strong adhesion to metallic substrates. Fusion-Bonded Epoxy (FBE) type epoxy resin has been used as a coating since the 1960s for a variety of purposes, including electrical insulation and corrosion protection. In piping, the applied FBE promotes a smooth surface that reduces friction with the walls, increasing hydraulic efficiency, reducing energy costs and reducing investments in pumps and compressors.

Polymers reinforced with materials of nanometric dimensions, known as nanocomposites, have aroused great interest from researchers and developers due to the significant improvement in the properties of materials with a very low amount of the nano-dispersed component. So far, a variety of epoxy-based composites with different particles, such as silica (RODRIGUES, T. "Formation of $CaCO_3$ deposits on surfaces coated with epoxy matrix nanocomposites with addition of $SiO_2$ nanoparticles", Masters Dissertation, UFRJ, 2016 and SALIBA, P. A., MANSUR, A. A. P., MANSUR, H. S. "Advanced Nanocomposite Coatings of Fusion Bonded Epoxy Reinforced with Amino-Functionalized Nanoparticles for Applications in Underwater Oil Pipelines", Journal of nanomaterials, 2016), clay (MORGAN, A. B. "Polymer-Clay Nanocomposites: Design and Application of Multi-Functional Materials", Material Matters, 2 2011) and carbon nanotubes (JEON, H. PARK, J. SHON, M. "Corrosion protection by epoxy coating containing multi-walled carbon nanotubes" Journal of Industrial and Engineering Chemistry, 19 2012 and MITTAL, G., DHAND, V., RHEE, K. Y., PARK, S., LEE, W. R. "A review on carbon nanotubes and graphene fillers in reinforced polymer nanocomposites" Journal of Industrial and Engineering chemistry, 21, 2015) were successfully prepared and their properties were well explored. More recently, graphene and graphene oxide (GO) sheets have also been used as "nano-additives for epoxy-based composites" (XIAO, W., LIU, Y., GUO, S., "Composites of graphene oxide and epoxy resin assuming a uniform 3D graphene oxide network structure", RSC Advances, 2016).

Among the most studied carbon materials for nanocomposites are carbon nanotubes and graphene. Graphene oxide (GO) is also a carbon-based nanomaterial with excellent performance and low cost. GO nanocomposites can be proposed for use in civil, mechanical and aerospace industries (ABDULLAH, S. I., ANSARI, M. N. M. "Mechanical properties of graphene oxide (GO)/epoxy composites" HBRC Journal, 11 (2014).

Graphene oxide (GO) and graphite oxide (GrO) are promising precursors for large-scale manufacture of graphene. Oxygenated functional groups covalently bonded to the GO structure can be thermally or chemically treated to obtain reduced graphene oxide (RGO), which partially restores the hydrophobicity and electrical conductivity of natural graphite for use as a filler material in 2D composite or conductive film.

The reduced graphene oxide receives this nomenclature since there is no reduction of all oxygenated groups of the GO structure. Therefore, RGO should not be called graphene, which corresponds to a graphite monolayer of high structural quality without defects and functionalizations. If the thermal reduction is compared to the chemical reduction of GO, it is concluded that it is an interesting alternative for the synthesis of graphene materials due to the simplicity and scalability of the process.

The thermal expansion of the GrO to obtain the RGO occurs when the rate of decomposition of the oxygenated groups of the GrO exceeds the rate of diffusion of the evolved gases, thus producing pressures that exceed the van der Waals forces that hold the sheets together, being essential to the success of the reduction process, minimizing the harmful effects of water vapor present in the GrO and eliminating the spacing between graphene layers associated with native graphite during the oxidation stage.

Mechanical means such as planetary ball mills, vibratory or by centrifugation are often used for mixing constituents in powders, whose mixing occurs by the kinetic energy of the balls on impact with the powder particles. Mills are used both on a laboratory scale and on an industrial scale. Differentiated final particle sizes can be obtained by varying amounts of charge and rotational speeds (which influence the impact energy). Other variables of the grinding process are: mill type, grinding time, type and size of grinding bodies, container filling level, process control agents used for temperature control.

The document WO 2010096345, 2009, entitled "Fusion bonded epoxy coating compositions that include magnesium oxide", comprises an epoxy powder coating composition with about 60 to 75% by weight of at least one epoxy resin; and about 1 to 4% by weight of at least one catechol novolac type adhesion promoter; about 15 to 35% by weight of an inorganic filler; about 1 to 5% by weight of a curing agent; about 0.1 to 3% by weight of an accelerator and about 0.1 to 2% by weight of magnesium oxide. It describes the use of FBE epoxy for coating pipe-type metals, but without adding carbon particles.

The document WO 2009112824, 2008, entitled "Coated metal pipe joints", refers to polymer coated metal pipe joints in addition to methods for forming coated metal pipe joints. In particular, it relates to composite materials for forming bonds between a coating that is applied as a liquid and a polymer coated pipe member, methods for forming metal coated pipe joints and uses of said composite material. It describes the use of coating in epoxy layers, but the same technology does not feature the addition of carbon particles.

The document WO 2009073716, 2007, entitled "Multi-layer anti-corrosive coating", describes the multi-layer coating for metallic pipes comprising a first metallic coating layer, a second metal and polymer coating layer, and a third layer of polymeric coating. The metallic material comprises several metallic alloys and the polymeric material comprises a mixture of a thermostable polymer (FBE) with some thermoplastic polymer (polyethylene, polypropylene, nylon, polytetrafluoroethylene (PTFE), ethylene methacrylate acid copolymer (EMAA). The invention describes the use of coating different surfaces from different polymers, including FBE, but the same technology does not add carbon particles.

The document WO 2011163100, 2010, with the following title "Powder coatings compositions", presents a composition useful for the preparation of cured coating comprising a formulation of at least one divinylarene dioxide resin (fusion-bonded epoxy) and at least one curing component. The composition is prepared from solid epoxy resins (SERs), epoxy phenolic resins (PERs) and poly(hydroxyl ethers) (PHEs). The invention describes the use of surface coating from mixtures of different epoxy resins with different curing agents, but the same technology does not feature the addition of carbon particles.

The document WO 2013187962, of 2012, "Low application temperature powder coating", describes powder coating compositions of the FBE type that include an epoxy resin composition and a curing agent. Powder coating compositions can be applied at low application temperatures of about 165° C. to 185° C. Mixing techniques can be performed by any available mechanical mixer or by manual mixing. The work does not describe the use of carbon nanomaterials, nor the necessary parameters for the mixing and incorporation of solid materials in the high energy planetary ball mill.

The patent US 2013244175, 2012—Lithographic printing plate precursors and methods of use—presents a lithographic printing plate precursor that is sensitive to infrared radiation, whose components comprise thermosetting hydrophobic particles (FBE) and comprise at least one pigment that could be a carbon black. The invention describes the manufacture of a board from FBE resin using carbon particle (carbon black) as a pigment for the board along with other pigments, but the same technology does not feature the addition of carbon nanoparticles.

The document U.S. Pat. No. 4,157,273A, of 2012, entitled "Bonding with a poly(arylene sulfide)-polytetrafluoroethylene adhesive", describes the application of ball mills or rods for mixing polymers (poly-arylene sulfide and polytetrafluoroethylene), but which preferentially diluent is used to aid in mixing and subsequent application to surfaces to be bonded. It also mentions the use of long mixing times (24 hours). The work does not describe the use of FBE epoxy and carbon nanomaterials, nor the necessary parameters for the mixing and incorporation of solid materials in a planetary ball mill, much less in a high energy planetary ball mill.

This technology intends to solve the difficulties of integration of carbon nanomaterials in FBE, which allows its application in coatings on metallic substrates with better mechanical performance and chemical resistance to corrosion, for example.

In the technology for which protection is claimed, a previous study of the mixing process and integration of the two solid matrices was carried out using times less than 10 minutes and rotations less than 230 rpm in a planetary ball mill, obtaining a mixture which, after application on heated steel, led to the formation of a composite whose average size distribution of agglomerates present in the coating was around 5 to 15 µm in diameter, values lower than those found in patent document RU 2654959, 2016, entitled "Superconcentrate of carbon nanotubes and the method of its production" where the mixture is made between NTC and liquid epoxy resin. The use of liquid resin-type epoxy facilitates the mixing and dispersion of the matrices due to the greater interaction between the components, which does not occur when the process is carried out with two solid components, as is the technical difficulty overcome with the method proposed in this technology.

The presence of agglomerates in composites can be a harmful factor to the material, which can lead to the formation of cracks, in addition to its embrittlement. In order to optimize the process of mixing and integrating these two solid materials, an original strategy was to use a high energy planetary ball mill. After mixing and integrating the materials, a highly dispersed material was obtained whose composite did not present agglomerates in the coating. This result presents itself as a technological advance regarding the production of composites from solid powders of the starting components.

A combination of a specific mixing process and effective integration results was obtained for an extremely challenging solid-solid dispersion system. The combined use of larger sized balls together with smaller sized balls presented an optimized solid nanocharge dispersion response in the solid polymer matrix. This unique combination of parameters with reduced operating ranges (time and rotation) and efficient dispersion results for a solid-solid system (consisting of a nanofiller and an FBE epoxy matrix) is a surprising effect compared to what is expected in the literature, which was obtained by the synergistic effect with the distribution of balls in a high energy mill.

Due to the intrinsic properties of FBE and RGO, both in solid state, the composite produced also has unique properties. The composites, produced with different concentrations of RGO (0.1; 0.3; 0.5 and 1.0% m/m), were tested to evaluate the adhesion between coating and metallic substrate, according to ASTM D 4541 method D, achieving adhesion increases of approximately 100% for some tested composites. Electrochemical tests showed improvements in corrosion protection for composite materials of FBE/RGO compared to coating with FBE without adding charges due to the improvement in the barrier mechanism promoted by the insertion of the nanocharge. These simultaneous property gains demonstrate multifunctional gains, which are not achieved with conventional additives.

The proposed technology presents an effective method of mixing and integrating carbon nanomaterials in FBE epoxy matrix, which is not reported in the state of the art. The integration process of solid materials involves a short mixing time in a planetary ball mill or high energy planetary ball mill, ensuring high uniformity of additives added to the polymer matrix. The application of the composite as a coating for metallic surfaces provides gains in abrasion resistance and adhesion to the metallic substrate.

BRIEF DESCRIPTION OF THE FIGURES

FIG. 1 shows scanning electron microscopy images for samples of RGO-ET (A) and RGO-RT (B).

FIG. 2 shows images obtained under a stereoscopic microscope or microscopic magnifying glass of the surface of composite coatings prepared from the dispersion of RGO in FBE, in two rotations (2230 rpm and 2000 rpm), with the addition of 0.1% w/w (A), 0.3% w/w (B), 0.5% w/w (C) and 1.0% w/w (B) of RGO-RT.

FIG. 3 presents a bar graph of pull-off adhesion before and after immersion in a hot bath.

DETAILED DESCRIPTION OF THE TECHNOLOGY

The present technology refers to an efficient process of mixing, dispersing and integrating reduced graphene oxide (RGO) or carbon nanomaterials or nanostructured materials to the epoxy matrix of the type "fusion-bonded epoxy" (FBE). The one-component polymeric material consists of a mixture of the particulate solid epoxy with a curing agent, catalyst, pigments and inorganic additives. The present technology allows to integrate nanometric particulate additives in FBE, by an efficient method of obtaining, using FBE in solid state. Powder FBE+RGO system mixes are produced by means of a planetary ball mill or high energy planetary ball mill with internal addition of balls, with time and rotation control. The mixtures show little or no sign of RGO aggregation after application of the composite as a coating on metals. The FBE+RGO mixture can be applied to metallic surfaces for protection against abrasive processes and corrosion without compromising the properties already presented by FBE applied without nanomaterials. Increases of up to 11% in abrasion resistance, improvement in the material's resistance to accelerated tests such as immersion in a hot water bath, and a significant increase in adhesion of approximately 100% after a hot bath immersion test were observed after addition of RGO to the FBE by the proposed method.

The process for incorporating carbon nanomaterials into a polymer matrix is the result of applying the following steps:
  a. producing reduced graphene oxide (RGO);
  b. sieving the RGO obtained in step "a";
  c. incorporating the RGO produced in step "a" into the fusion-bonded epoxy polymer matrix (FBE) in powder form, with a ratio of 1 g/kg to 10 g/kg of RGO in relation to FBE, using a planetary ball mill or high energy planetary ball mill, for a period of time of 1 to 10 minutes, with speed between 200 and 2000 rpm.

In step "a" the RGO will be produced through the thermal reduction of graphene oxide (GO) in an oven or heating oven for a period of time between 10 and 100 minutes, at an internal temperature of the oven between 120° C. and 200° C.

RGO be produced, also in step "a", via reduction and thermal expansion of graphite oxide (GrO) in a microwave oven for a period of time between 1 and 5 minutes, using an oven heating power between 50 and 100%.

The graphene oxide to be reduced may present an oxidation degree between 25 and 50%, evaluated by the loss of mass between 100 and 400° C. in thermogravimetric analysis with synthetic air atmosphere.

Obtaining reduced graphene oxide via thermal reduction in an oven (RGO-RT) can present a degree of oxidation between 6 and 13%, evaluated by the loss of mass between 100 and 400° C. in thermogravimetric analysis with a synthetic air atmosphere.

The graphite oxide to be reduced and expanded can present an oxidation degree between 25 and 50%, evaluated by the loss of mass between 100 and 400° C. in thermogravimetric analysis with synthetic air atmosphere.

Obtaining reduced graphene oxide via reduction and thermal expansion in microwave oven (RGO-ET) can present a degree of oxidation between 6 and 13%, evaluated by mass loss between 100 and 400° C. in thermogravimetric analysis with synthetic air atmosphere.

In step "c" the use of a system composed of a set of balls with a diameter between 5 and 10 mm and balls with a diameter between 10 and 20 mm.

The number of balls with a diameter between 5 and 10 mm is 1.5 to 3 times greater than the number of balls with a diameter between 10 and 20 mm.

In step "c" the incorporation of carbon nanomaterials to the polymeric matrix of FBE in powder form.

The fusion-bonded epoxy (FBE) nanomodified by dispersion of reduced graphene oxide, in the proportion of 0.1% to 1.0% w/w of graphene in relation to FBE.

The composite can be used adhered to metal surfaces for protection against corrosion and against abrasive processes. Preferably, it can be used in the application of the composite on metallic surfaces comprising a thickness between 200 and 500 μm, for a cure time between 25 and 100 minutes, at a cure temperature between 160 and 220° C.

The present technology is better understood through the examples described below, not limiting it.

EXAMPLE 1—PROCESS FOR INCORPORATING CARBON NANOMATERIALS INTO A POLYMERIC MATRIX

Fusion-Bonded Epoxy (FBE) or fusion-bonded epoxy material is widely used in Valspar Pipeclad 2000 thermosetting epoxy coating system, imported from the United States of America, used in corrosion protection in steel pipelines exposed to more demanding operating environments.

GO samples were dried in a lyophilizer and the solid obtained was taken to the knife mill. The material was separated in a sieve until obtaining the powders in the same particle size as the epoxy (diameter less than 0.25 mm).

The ground GO was placed in a glass beaker sealed with aluminum foil (semi-open system), and this system was taken to an oven for 20 min at 180° C., for thermal reduction process and production of graphene oxide reduced via thermal reduction (RGO-RT). FIG. 1B shows a representative scanning electron microscopy (SEM) image of the wrinkled morphology of the RGO-RT nanosheets.

The GrO was added in a quartz crucible with a lid and the material was placed in the conventional microwave for 5 min, power 70%. The GrO heating, drying, reduction and thermal expansion process was carried out, followed by obtaining reduced graphene oxide via thermal expansion (RGO-ET). FIG. 1A shows a representative scanning electron microscopy (SEM) image of the wrinkled morphology of the RGO-ET nanosheets.

The reduced graphene oxides (RGO-RT and RGO-ET) and the epoxy used in this work were processed in powder form. The materials were sieved using a 0.25 mm diameter sieve, that is, the grain size used is less than 0.25 mm. The mixtures were prepared in a planetary ball mill or high energy planetary ball mill, using 6 balls, 2 with a diameter between 10 to 20 mm and 4 with a diameter of 5 to 10 mm. The mill was operated at a rotation between 230 to 2000 rpm for a period of 10 minutes.

All mixtures were produced at different concentrations of nanofiller RGO-RT (0.1%, 0.3%, 0.5% and 1.0% w/w) and RGO-ET (0.1%, 0.3%, 0.5% and 1.0% w/w). The same grinding process was carried out with FBE without adding nanofiller. FIG. 2 shows representative microscopic magnifying images of the surface of FBE composite coatings with RGO-RT produced with ball mills at two speeds of rotation (230 rpm and 2000 rpm).

The mixtures obtained after processing in a planetary ball mill, were applied on SAE 1020 steel sheets of dimensions 100×100 mm, with coating thickness between 200 to 400 μm. The coated sheets were tested to assess the adhesion between the coating and the metallic substrate, according to ASTM D 4541 method D. The same adhesion test was performed on samples immersed in a hot water bath (hot immersion, temperature of 80° C.) for 48 h. The immersion was carried out in accordance with the ISO 21809-1 standard. Improvements in the adhesion of the coating to the metallic substrate were observed, with increases of approximately 100% for the composites FBE/RGO-RT 1% w/w and FBE/RGO-ET 0.5% w/w (FIG. 3).

The invention claimed is:

1. A process for incorporating carbon nanomaterials into a polymeric matrix, comprising:
   a. producing reduced graphene oxide (RGO);
   b. sieving the RGO obtained in step "a";
   c. incorporating the RGO produced in step "a" into a fusion-bonded epoxy polymer matrix (FBE) in powder form, with a ratio of 1 g/kg to 10 g/kg of RGO in relation to the FBE, using a planetary ball mill or high energy planetary ball mill, for a period of time of 1 to 10 minutes, with speed between 200 and 2000 rpm.

2. The process for incorporating carbon nanomaterials into a polymeric matrix, according to claim 1, step "a", wherein the RGO is produced through a thermal reduction of graphene oxide (GO) in an oven or heating oven by a period of time between 10 and 100 minutes, at an internal temperature of the oven between 120° C. and 200° C.

3. The process for incorporating carbon nanomaterials into a polymeric matrix, according to claim 1, step "a", wherein the RGO is produced via reduction and thermal expansion of graphite oxide (GRO) in a microwave oven by a period of time between 1 and 5 minutes, using an oven heating power between 50 and 100%.

4. The process for incorporating carbon nanomaterials into a polymeric matrix, according to claim 2, wherein the graphene oxide to be reduced may present an oxidation degree between 25 and 50%, evaluated by mass loss between 10° and 400° C. in thermogravimetric analysis with synthetic air atmosphere.

5. The process for incorporating carbon nanomaterials into a polymeric matrix, according to claim 2, wherein the reduction of graphene oxide via thermal reduction in an oven (RGO-RT) presents an oxidation degree between 6 and 13%, evaluated by mass loss between 10° and 400° C. in thermogravimetric analysis with synthetic air atmosphere.

6. The process for incorporating carbon nanomaterials into a polymeric matrix, according to claim 3, wherein the graphite oxide to be reduced and expanded may present an oxidation degree between 25 and 50%, evaluated by mass loss between 10° and 400° C. in thermogravimetric analysis with synthetic air atmosphere.

7. The process for incorporating carbon nanomaterials into a polymeric matrix, according to claim 3, wherein the reduction of graphene oxide via reduction and thermal expansion in microwave oven (RGO-ET) presents an oxidation degree between 6 and 13%, evaluated by the loss of mass between 10° and 400° C. in thermogravimetric analysis with a synthetic air atmosphere.

8. The process for incorporating carbon nanomaterials into a polymeric matrix, according to claim 1, wherein step "c" is carried out by using a system composed of a set of balls with a diameter between 5 and 10 mm and balls with a diameter between 10 and 20 mm.

9. The process for incorporating carbon nanomaterials into a polymeric matrix, according to claim 8, wherein the number of balls with a diameter between 5 and 10 mm is 1.5 to 3 times greater than the number of balls with a diameter between 10 and 20 mm.

10. The process for incorporating carbon nanomaterials into a polymeric matrix, according to claim 1, wherein step "c" is carried out by incorporating carbon nanomaterials to the polymeric matrix of FBE in powder form.

11. A composite of carbon nanomaterials incorporated into a polymeric matrix obtained by the process defined in claim 1, wherein the fusion-bonded epoxy (FBE) is nano-modified by dispersion of reduced graphene oxide, in a proportion of 0.1% to 1.0% w/w graphene in relation to FBE.

12. A method for protecting against corrosion and abrasive processes of metal surfaces comprising applying the composite of claim 11 to metal surfaces for protection against corrosion and against abrasive processes.

13. The method according to claim 12, wherein the composite comprises a thickness between 200 and 500 mm, and is cured for a curing time between 25 and 100 minutes, at a curing temperature between 16° and 220° C.

* * * * *